Patented July 24, 1934

1,967,809

UNITED STATES PATENT OFFICE 1,967,809

PROCESS OF MAKING HARD RUBBER DUST AND THE PRODUCT THEREOF

Fayette Dudley Chittenden, Providence, R. I., assignor to Revere Rubber Company, Providence, R. I., a corporation of Rhode Island No Drawing. Application December 15, 1931, Serial No. 581,270

18 Claims. (Cl. 18—53)

This invention relates to a process of making hard rubber dust, and the product thereof.

Hard rubber dust is a very valuable compounding ingredient for the production of hard rubber articles. For many purposes in the arts, hard rubber has an established standing, and none of the various plastics developed in recent years have been able to replace hard rubber for all of these. Hard rubber, as is well known, is formed by compounding rubber with a much larger percentage of sulphur than is used in the manufacture of soft rubber goods, and heating the compound for a much longer time and at a higher temperature than in the case of vulcanized soft rubber. In compounding hard rubber stocks one of the ingredients used for many years has been hard rubber dust. Probably the first use of this material was merely to furnish an outlet for scrap hard rubber. However, it has been known for a long time that the addition of hard rubber dust to a hard rubber compound imparts a number of desirable properties, such as reducing shrinkage in the mold, imparting gloss to the molded article, and giving a faster rate of cure. As a result of the demand for hard rubber dust, is has been necessary to supplement the supply of scrap hard rubber by curing mixtures of crude or reclaimed rubber with sulphur to hard rubber and then grinding the product.

The grinding of hard rubber is a difficult and expensive operation. There is a further objection in the fire and explosion risk due to the inflammability of the material. There are also certain disadvantages in the use of scrap hard rubber, such as variation in the quality due to variation in cure, amount of free and combined sulphur, and amount of compounding or filling materials. Another disadvantage is that hard rubber scrap frequently contains foreign matter, such as small metal inserts which are ground up and will only show up in the polished, finished article. This invention relates to a process for making hard rubber dust, and more particularly to a process in which the time required to vulcanize a rubber and sulphur mixture to hard rubber is greatly reduced, and in which the disintegration of the hard rubber to dust is accomplished wholly or in part by exploding the hard rubber mass.

In carrying out the invention, I produce a hard rubber dust by heating an intimate mixture of rubber, sulphur and water, in which the rubber and sulphur are in proportions adapted to yield hard rubber, in a bomb under high pressure at vulcanizing temperature, as in the presence of high pressure steam, and suddenly releasing the pressure. High pressure steam may be introduced directly into the bomb to effect the vulcanization to hard rubber or the bomb may be heated externally. If the bomb is heated externally, high pressure steam will be produced from the water in the mixture in the bomb. After the vulcanization is completed, the sudden release of the pressure expels the high pressure steam from the bomb and explodes the hard rubber mass in the bomb producing directly a hard rubber dust. The mixture introduced into the bomb may be prepared in various ways. By one method, I prepare the intimate mixture of rubber, sulphur, and water from an aqueous dispersion of rubber, either natural or artificial, by adding sulphur to the dispersion and so treating or compounding it that the rubber, compounding ingredients, vulcanizing or curing ingredients, etc., remain in intimate contact during the vulcanization step. This may be accomplished by thickening the dispersion to a sufficient viscosity so that the sulphur and any filler or other compounding ingredients that may be added do not settle out on long standing. The thickened dispersion may be such that the compounding ingredients do not settle during the heating, or it may be such that it coagulates to give an intimate spongy mixture of rubber, compounding ingredients, and water during the heat treatment. By another method an aqueous dispersion of rubber to which sulphur and if desired, other compounding ingredients have been added, is coagulated by the use of well known coagulating agents such as acetic acid, formic acid, alum, etc., to a "liver" which consists of an intimate mixture of rubber, sulphur, compounding ingredients, and water and this "liver" introduced into the bomb. I may also prepare the intimate mixture of rubber, sulphur and water by incorporating water into rubber such as crude rubber, reclaimed rubber, etc., by mechanical action such as milling, and use this as a starting substance. The sulphur and any other vulcanizing and/or compounding ingredients are preferably milled into the rubber before the incorporation of water therein, and the intimate mixture of rubber, sulphur, and water thus formed, is introduced into the bomb. Depending upon conditions employed, the product may be in a form for use directly in hard rubber manufacture or in a form in which it can be readily disintegrated to a fine hard rubber dust.

As a specific illustration of one manner of carrying out the invention, but without intention to limit the invention except as required by the prior art, the following example is included:—100 parts of rubber (solids) in the form of normal latex are mixed with 60 parts of sulphur in the form of an aqueous paste and the resulting mixture thickened by the use of a small amount of any of the well known thickening agents such as glue, gelatin, gums, starches, dextrins, alginates, caseinates, silica gel, soaps, alkali sulphates, formaldehyde, various metallic compounds such as litharge, zinc oxide, lead thiosulphate, basic lead acetate, lead hydroxide, ferric oxide, ferrous lactate, basic ferric acetate, stannous oxalate, cadmium sulphide, acids such as boric acid, etc., so that the sulphur and rubber remain in intimate contact even upon long standing. The dispersion in this way is thickened to a sufficient viscosity so that the sulphur and any filler or other compounding ingredients that may be added do not settle out on standing. This mixture is introduced into a high pressure bomb and heat applied either by external heating of the bomb or by admission of high pressure steam into the interior of the bomb. The pressure is raised rapidly to 1000 lbs. per square inch gauge and the apparatus held at this pressure for 30 minutes. The pressure is then suddenly released by a quick opening valve to explode the hard rubber mass therein, and the contents of the bomb discharged into a suitable container.

The character of the hard rubber product prepared by this invention may easily be varied to meet requirements by varying the ingredients used and the conditions of processing. Thus creamed latex, concentrated latex, and/or dispersions of reclaimed, crude, or off-grade rubbers, may be used. In addition, various types of sulphur, such as precipitated, flowers, colloidal, etc., may be used and the ratio of rubber to sulphur varied as required. I have found that about 30 to 100 parts of sulphur to 100 parts of rubber (solids) produce excellent results. Compounding ingredients such as fillers, softeners, accelerators, etc. may be incorporated into the rubber, sulphur, and water mixture. Other thickening agents than those mentioned may be used. The rate of increasing the pressure may be varied depending upon the size of the bomb and the final pressure used. I have found that at least 500 pounds per square inch gauge pressure is to be desired, but in certain cases lower pressures may be utilized. The time the material remains in the bomb may be varied as required.

In view of the many changes and modifications which may be made without departing from the principles underlying the invention, reference should be made to the appended claims for an understanding of the scope of the invention.

Having thus described my invention, what I claim and desire to protect by Letters Patent is:

1. A process comprising heating under high pressure at vulcanizing temperature for a period of time sufficient to produce hard rubber from said mixture an intimate mixture containing rubber, sulphur, and water, the rubber and sulphur being in proportions adapted to yield hard rubber, and suddenly releasing the pressure.

2. A process comprising heating an intimate mixture containing rubber, sulphur, and water, the rubber and sulphur being in proportion of 100 parts rubber to 30 to 100 parts of sulphur, in the presence of high pressure steam for a period of time sufficient to produce hard rubber from said mixture, and suddenly releasing the pressure.

3. A process comprising heating an intimate mixture containing rubber, sulphur, and water, the rubber and sulphur being in proportion of 100 parts rubber to approximately 60 parts sulphur, in the presence of steam under at least 500 pounds per square inch pressure for a period of time sufficient to produce hard rubber from said mixture, and suddenly releasing the pressure.

4. A process comprising mixing vulcanizing ingredients with an aqueous dispersion of rubber in proportions adapted to yield hard rubber, heating the mixture under high pressure at vulcanizing temperature for a period of time sufficient to produce hard rubber from said mixture, and suddenly releasing the pressure.

5. A process comprising mixing sulphur with an aqueous dispersion of rubber in the proportion of 100 parts rubber solids to 30 to 100 parts sulphur, heating the mixture in the presence of high pressure steam for a period of time sufficient to produce hard rubber from said mixture, and suddenly releasing the pressure.

6. A process comprising mixing sulphur with an aqueous dispersion of rubber in the proportion of 100 parts rubber to approximately 60 parts sulphur, thickening the mixture, heating the mixture under high pressure at vulcanizing temperature for a period of time sufficient to produce hard rubber from said mixture, and suddenly releasing the pressure.

7. A process comprising mixing vulcanizing ingredients with an aqueous dispersion of rubber in proportions adapted to yield hard rubber, thickening the mixture, heating the mixture in the presence of high pressure steam for a period of time sufficient to produce hard rubber from said mixture, and suddenly releasing the pressure.

8. A process comprising mixing vulcanizing ingredients with an aqueous dispersion of rubber in proportions adapted to yield hard rubber, coagulating the mixture to a solid mass consisting of an intimate mixture containing rubber, vulcanizing ingredients, and water, heating said mass under high pressure at vulcanizing temperature for a period of time sufficient to produce hard rubber from said mixture, and suddenly releasing the pressure.

9. A process comprising mixing sulphur with an aqueous dispersion of rubber in the proportion of 100 parts rubber solids to 30 to 100 parts sulphur, coagulating the mixture to a solid mass consisting of an intimate mixture containing rubber, sulphur, and water, heating said mass in the presence of high pressure steam for a period of time sufficient to produce hard rubber from said mixture, and suddenly releasing the pressure.

10. A process comprising mixing sulphur with an aqueous dispersion of rubber in the proportion of 100 parts rubber solids to approximately 60 parts sulphur, coagulating the mixture to a solid mass consisting of an intimate mixture containing rubber, sulphur, and water, heating said mass in the presence of steam under at least 500 pounds per square inch pressure for a period of time sufficient to produce hard rubber from said mixture, and suddenly releasing the pressure.

11. A process comprising incorporating water and vulcanizing ingredients uniformly into a rubber compound in proportions to yield hard rubber, heating the mixture under high pressure at vulcanizing temperature for a period of time sufficient to produce hard rubber from said mixture, and suddenly releasing the pressure.

12. A process comprising incorporating water uniformly into a rubber compound containing vulcanizing ingredients and adapted to yield hard rubber, heating the mixture in the presence of high pressure steam for a period of time sufficient to produce hard rubber from said mixture, and suddenly releasing the pressure.

13. A process comprising incorporating water uniformly into a rubber compound containing 100 parts of rubber to 30 to 100 parts of sulphur, heating the mixture in the presence of high pressure steam for a period of time sufficient to produce hard rubber from said mixture, and suddenly releasing the pressure.

14. A process comprising incorporating water uniformly into a rubber compound containing 100 parts rubber to approximately 60 parts of sulphur, heating the mixture in the presence of steam under at least 500 pounds per square inch pressure for a period of time sufficient to produce hard rubber from said mixture, and suddenly releasing the pressure.

15. As a new product, hard rubber dust derived directly from an explosion of a rubber mass.

16. As a new product, hard rubber dust derived directly from an explosion of an intimate mixture of rubber, vulcanizing ingredients and water.

17. As a new product, hard rubber dust derived directly from a hard rubber mass under pressure by a sudden release of the pressure.

18. As a new product, hard rubber dust derived directly from a hard rubber mass under high steam pressure by a sudden release of the pressure and accompanying explosion of the mass.

F. DUDLEY CHITTENDEN.